US012715782B2

(12) United States Patent
Nelson et al.

(10) Patent No.: US 12,715,782 B2
(45) Date of Patent: Aug. 25, 2026

(54) METHOD OF MAKING A SPINEL CATHODE ACTIVE MATERIAL FROM A MIXED METAL COMPOSITION, AND A CATHODE ACTIVE MATERIAL MADE FROM THE SAME

(71) Applicant: Redwood Materials, Carson City, NV (US)

(72) Inventors: Alan Nelson, Carson City, NV (US); Yu-Hua Kao, Carson City, NV (US); Benjamin Malley, Carson City, NV (US); Fangfu Zhang, Carson City, NV (US); Edward Matios, Carson City, NV (US)

(73) Assignee: Redwood Materials, Carson City, NV (US)

( * ) Notice: Subject to any disclaimer, the term of this patent is extended or adjusted under 35 U.S.C. 154(b) by 534 days.

(21) Appl. No.: 18/136,616

(22) Filed: Apr. 19, 2023

(65) Prior Publication Data

US 2023/0357048 A1 Nov. 9, 2023

Related U.S. Application Data

(60) Provisional application No. 63/338,485, filed on May 5, 2022.

(51) Int. Cl.
*C01G 53/44* (2025.01)
*C01G 53/82* (2025.01)

(52) U.S. Cl.
CPC ............. *C01G 53/44* (2013.01); *C01G 53/82* (2025.01); *C01P 2002/32* (2013.01); *C01P 2006/40* (2013.01)

(58) Field of Classification Search
CPC ........ H01M 4/131; C01G 53/44; C01G 53/82
(Continued)

(56) References Cited

U.S. PATENT DOCUMENTS

2011/0311869 A1 12/2011 Oh et al.
2014/0170492 A1 6/2014 Xia et al.
(Continued)

FOREIGN PATENT DOCUMENTS

CN 102157726 B * 10/2013
CN 103633392 A * 3/2014 ............. H01M 4/50
(Continued)

OTHER PUBLICATIONS

International Search Report and Written Opinion for the corresponding International Application No. PCT/US2023/019210; Date of Mailing: Aug. 10, 2023; 10 pages.
(Continued)

*Primary Examiner* — Sean P Cullen
(74) *Attorney, Agent, or Firm* — Stites & Harbison, PLLC

(57) ABSTRACT

A method of making a cathode active material includes contacting a mixed metal composition with water to form a first solution. The mixed metal composition includes nickel, manganese, or nickel and manganese. A salt of nickel, manganese, or a combination thereof is added to the first solution to provide a second solution which can be further combined with a cosolvent to provide a third solution. The third solution can be further combined with a basic solution to provide a precipitate, which can be combined with a lithium compound and treated to provide the cathode active material having at least one phase having a spinel structure.

19 Claims, 1 Drawing Sheet

(58) Field of Classification Search
USPC ........................ 429/231.95; 423/179, 594.15
See application file for complete search history.

(56) References Cited

U.S. PATENT DOCUMENTS

| | | | | |
|---|---|---|---|---|
| 2014/0367610 | A1* | 12/2014 | Noguchi | H01M 4/587 252/182.1 |
| 2015/0372303 | A1 | 12/2015 | Kao et al. | |
| 2022/0131204 | A1 | 4/2022 | Wang et al. | |

FOREIGN PATENT DOCUMENTS

| | | | | | |
|---|---|---|---|---|---|
| CN | 104659438 | A * | 5/2015 | | |
| CN | 112830526 | A * | 5/2021 | H01M 4/505 | |
| EP | 3163656 | A1 | 5/2017 | | |
| KR | 20150075200 | A | 7/2015 | | |
| WO | WO-2015111761 | A1 * | 7/2015 | C01G 45/01 | |

OTHER PUBLICATIONS

Shiming et al. “A novel strategy to significantly enhance the initial voltage and suppress voltage fading of a Li- and Mn-rich layered oxide cathode material for lithium-ion batteries”: Journal of Materials Chemistry A. vol. 6. No. 8. Jan. 1, 2018: pp. 3610-3624.

Yu et al.“Layered-spinel capped nanotube assembled 3D Li-rich hierachitectures for high performance Li-ion battery cathodes”: Journal of Materials Chemistry A: vol. 4: 2016: pp. 18416-18425.

European Search Report for EP Application No. 23799817.4 Issued Jul. 13, 2026.

* cited by examiner

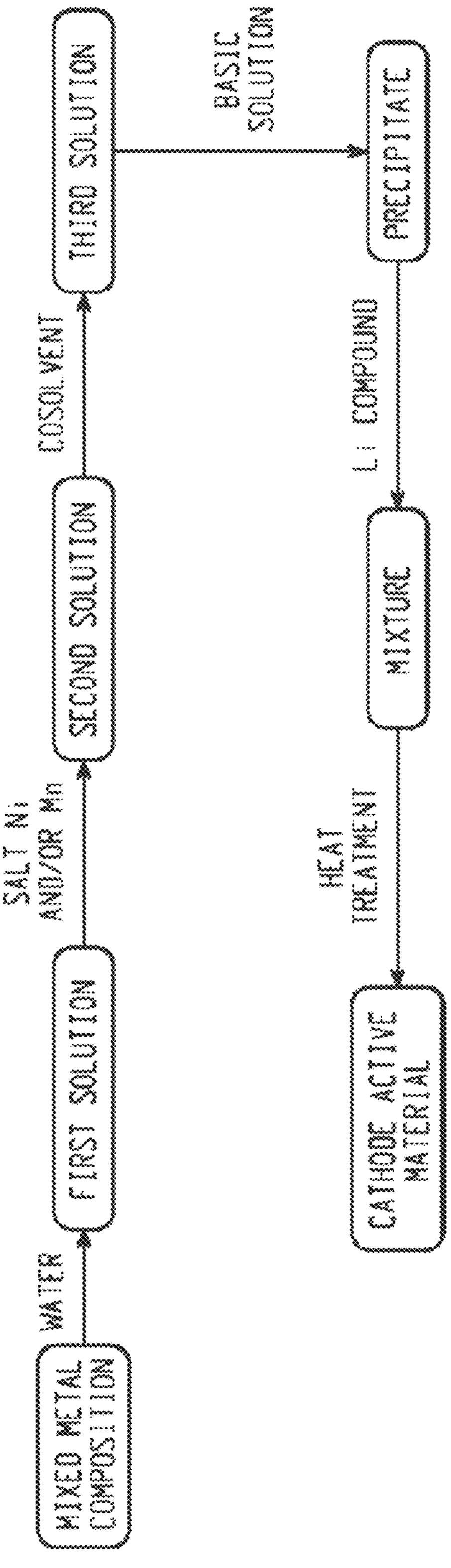
MIXED METAL
COMPOSITION
WATER
FIRST SOLUTION
SALT Ni
AND/OR Mn
SECOND SOLUTION
COSOLVENT
THIRD SOLUTION
BASIC
SOLUTION
PRECIPITATE
Li COMPOUND
MIXTURE
HEAT
TREATMENT
CATHODE ACTIVE
MATERIAL

METHOD OF MAKING A SPINEL CATHODE ACTIVE MATERIAL FROM A MIXED METAL COMPOSITION, AND A CATHODE ACTIVE MATERIAL MADE FROM THE SAME

CROSS REFERENCE TO RELATED APPLICATION

This application claims priority to U.S. Provisional Patent Application No. 63/338,485, filed on May 5, 2022 in the United States Patent and Trademark Office, and all the benefits accruing therefrom under 35 U.S.C. § 119, the contents of which are incorporated by reference herein in their entirety.

BACKGROUND

Lithium-ion batteries have become a popular power source in various applications including consumer electronics and electric vehicles. Millions of cells have been produced. Nonetheless, there remains a continuing need for improved methods of recovering and repurposing spent batteries. It would be particularly advantageous to provide a method for preparing cathode active materials having a particular structure for new batteries from other than new feedstock.

SUMMARY

In an aspect, a method of making a cathode active material comprises contacting a mixed metal composition with water to form a first solution, the mixed metal composition comprising nickel, and greater than 0 to 2 weight percent, based on the total weight of the mixed metal composition, of a compound comprising Co, Mn, Al, Cu, Fe, Mg, Na, Ca, Zn, F, Si, Li, or a combination thereof; adding a salt of nickel, manganese, or a combination thereof to the first solution to provide a second solution; adding a cosolvent to the second solution to provide a third solution; combining the third solution and a basic solution to form a precipitate; adding a lithium compound to the precipitate to form a mixture; and heat-treating the mixture under conditions effective to provide the cathode active material, wherein the cathode active material comprises at least one phase having a spinel structure.

In an aspect, a method of making a cathode active material comprises contacting a mixed metal composition with water to form a first solution, the mixed metal composition comprising nickel and manganese, and greater than 0 to 2 weight percent, based on the total weight of the mixed metal composition, of a compound comprising Co, Al, Cu, Fe, Mg, Na, Ca, Zn, F, Si, Li, or a combination thereof; adding a salt of nickel, manganese, or a combination thereof to the first solution to provide a second solution; adding a cosolvent to the second solution to provide a third solution; combining the third solution and a basic solution to form a precipitate; adding a lithium compound to the precipitate to form a mixture; and heat-treating the mixture under conditions effective to provide the cathode active material; wherein the cathode active material comprises at least one phase having a spinel structure.

In an aspect, a method of making a cathode active material comprises contacting a mixed metal composition with water to form a first solution, the mixed metal composition comprising manganese, and greater than 0 to 2 weight percent, based on the total weight of the mixed metal composition, of a compound comprising Co, Al, Cu, Fe, Mg, Na, Ca, Zn, F, Si, Li, or a combination thereof; adding a salt of nickel, manganese, or a combination thereof to the first solution to provide a second solution; adding a cosolvent to the second solution to provide a third solution; combining the third solution and a basic solution to form a precipitate; adding a lithium compound to the precipitate to form a mixture; and heat-treating the mixture under conditions effective to provide the cathode active material, wherein the cathode active material comprises at least one phase having a spinel structure.

In an aspect, a cathode active material comprises a first phase having a formula of $Li_{1+x}M_{2+y}O_{4-z}A_z$ and having a spinel structure; and a second phase, wherein M is Ni and Mn; A is an oxygen vacancy, F, Cl, or a combination thereof; $0 \le x \le 0.2$; $0 \le y \le 0.1$; $0 \le z \le 0.1$; and the second phase is derived from a recycled feedstock.

In an aspect, a cathode active material comprises a first phase having a formula of $Li_{1+x}M_{2+y}O_{4-z}A_z$ and having a spinel structure, wherein M is Ni, and Mn, A is an oxygen vacancy, F, Cl, or a combination thereof, $0 \le x \le 0.2$, $0 \le y \le 0.1$, $0 \le z \le 0.1$, and wherein the first phase further comprises Co, Al, Cu, Fe, Mg, Na, Ca, Zn, F, Si, Li, or a combination thereof.

The above described and other features are exemplified by the following FIGURE and detailed description.

BRIEF DESCRIPTION OF THE DRAWING

The following FIGURE represents an exemplary embodiment.

The FIGURE shows a flow chart of an exemplary method according to the present disclosure.

DETAILED DESCRIPTION

The present inventors have discovered a method for re-manufacturing batteries and battery materials, particularly cathode active materials and the precursors thereof, wherein the cathode active materials have at least one phase having a spinel structure. Cathode active materials prepared according to the methods described herein are expected to exhibit comparable or improved battery performance, despite utilizing high percentages of feedstock derived from exhausted batteries or battery manufacturing scrap.

Accordingly, an aspect of the present disclosure is a method of making a cathode active material from a mixed metal composition. In an aspect, the mixed metal composition comprises a mixed metal sulfate, a mixed metal nitrate, a mixed metal carbonate, a mixed metal halide, a mixed metal hydroxide, a mixed metal oxalate, or a combination thereof. In a specific aspect, the mixed metal composition comprises a mixed metal sulfate.

In an aspect, the mixed metal composition comprises nickel. Nickel may be present in the mixed metal composition in an amount of at least 5 weight percent, or at least 10 weight percent or at least 15 weight percent, or at least 18 weight percent, based on a total weight of the mixed metal composition. In an aspect, nickel may be present in the mixed metal composition in an amount of 5 to 98 weight percent, or 5 to 85 weight percent, or 5 to 75 weight percent, or 5 to 50 weight percent, or 15 to 25 weight percent, based on a total weight of the mixed metal composition. The mixed metal composition may further include greater than 0 to 2 weight percent, based on the total weight of the mixed metal composition, of a compound comprising Co, Mn, Al, Cu, Fe, Mg, Na, Ca, Zn, F, Si, Li, or a combination thereof. For example, the mixed metal composition can comprise greater than 0 to 1.5 weight percent, or greater than 0.0001 to 1 weight percent, or greater than 0.001 to 0.5 weight percent, or greater than 0 to 0.1 weight percent, or greater than 0 to 0.01 weight percent (100 ppm) of the compound comprising Co, Mn, Al, Cu, Fe, Mg, Na, Ca, Zn, F, Si, Li, or a combination thereof, based on a total weight of the mixed metal composition. In an aspect, the mixed metal composition can comprise greater than 0 to 1000 ppm, or greater than 0 to 750 ppm, or 5 to 750 ppm, or 5 to 1000 ppm, or 25 to 1000 ppm, or 25 to 750 ppm, or 50 to 750 ppm, or 100 to 750 ppm of the compound comprising Co, Mn, Al, Cu, Fe, Mg, Na, Ca, Zn, F, Si, Li, or a combination thereof, based on a total weight of the mixed metal composition. For example, the mixed metal composition can comprise 0.5 to 1.5 weight percent Co, 50 to 300 ppm Cu, 50 to 200 ppm of Al, 5 to 100 ppm of Fe, and 5 to 100 ppm of F, each based on the total weight of the mixed metal composition. In an aspect, the mixed metal composition can comprise lithium. When present, lithium can preferably be present in the mixed metal composition in an amount of 100 to 1000 ppm, based on the total weight of the mixed metal composition.

In an aspect, the mixed metal composition comprises nickel and manganese (e.g., wherein nickel and manganese are present as major constituents in the mixed metal composition). For example, nickel and manganese may be present in the mixed metal composition in an amount of at least 5 weight percent, or at least 10 weight percent, or at least 15 weight percent, or at least 18 weight percent, based on a total weight of the mixed metal composition. In an aspect, nickel and manganese may be present in the mixed metal composition in an amount of 5 to 98 weight percent, or 5 to 85 weight percent, or 5 to 75 weight percent, or 5 to 50 weight percent, or 15 to 25 weight percent, based on a total weight of the mixed metal composition. The mixed metal composition may further include greater than 0 to 2 weight percent, based on the total weight of the mixed metal composition, of a compound comprising Co, Al, Cu, Fe, Mg, Na, Ca, Zn, F, Si, Li, or a combination thereof. For example, the mixed metal composition can comprise greater than 0 to 1.5 weight percent, or greater than 0.0001 to 1 weight percent, or greater than 0.001 to 0.5 weight percent, or greater than 0 to 0.1 weight percent, or greater than 0 to 0.01 weight percent (100 ppm) of the compound comprising Co, Al, Cu, Fe, Mg, Na, Ca, Zn, F, Si, Li, or a combination thereof, based on a total weight of the mixed metal composition. In an aspect, the mixed metal composition can comprise greater than 0 to 1000 ppm, or greater than 0 to 750 ppm, or 5 to 750 ppm, or 5 to 1000 ppm, or 25 to 1000 ppm, or 25 to 750 ppm, or 50 to 750 ppm, or 100 to 750 ppm of the compound comprising Co, Al, Cu, Fe, Mg, Na, Ca, Zn, F, Si, Li, or a combination thereof, based on a total weight of the mixed metal composition. For example, the mixed metal composition can comprise 0.5 to 1.5 weight percent Co, 50 to 300 ppm Cu, 50 to 200 ppm of Al, 5 to 100 ppm of Fe, and 5 to 100 ppm of F, each based on the total weight of the mixed metal composition. In an aspect, the mixed metal composition can comprise lithium. When present, lithium can preferably be present in the mixed metal composition in an amount of 100 to 1000 ppm, based on the total weight of the mixed metal composition.

In an aspect, the mixed metal composition comprises manganese. Manganese may be present in the mixed metal composition in an amount of at least 5 weight percent, or at least 10 weight percent, or at least 15 weight percent, or at least 18 weight percent, based on a total weight of the mixed metal composition. In an aspect, manganese may be present in the mixed metal composition in an amount of 5 to 98 weight percent, or 5 to 85 weight percent, or 5 to 75 weight percent, or 5 to 50 weight percent, or 15 to 25 weight percent, based on a total weight of the mixed metal composition. The mixed metal composition may further include greater than 0 to 2 weight percent, based on the total weight of the mixed metal composition, of a compound comprising Co, Al, Cu, Fe, Mg, Na, Ca, Zn, F, Si, Li, or a combination thereof. For example, the mixed metal composition can comprise greater than 0 to 1.5 weight percent, or greater than 0.0001 to 1 weight percent, or greater than 0.001 to 0.5 weight percent, or greater than 0 to 0.1 weight percent, or greater than 0 to 0.01 weight percent (100 ppm) of the compound comprising Co, Al, Cu, Fe, Mg, Na, Ca, Zn, F, Si, Li, or a combination thereof, based on a total weight of the mixed metal composition. In an aspect, the mixed metal composition can comprise greater than 0 to 1000 ppm, or greater than 0 to 750 ppm, or 5 to 750 ppm, or 5 to 1000 ppm, or 25 to 1000 ppm, or 25 to 750 ppm, or 50 to 750 ppm, or 100 to 750 ppm of the compound comprising Co, Al, Cu, Fe, Mg, Na, Ca, Zn, F, Si, Li, or a combination thereof, based on a total weight of the mixed metal composition. For example, the mixed metal composition can comprise 0.5 to 1.5 weight percent Co, 50 to 300 ppm Cu, 50 to 200 ppm of Al, 5 to 100 ppm of Fe, and 5 to 100 ppm of F, each based on the total weight of the mixed metal composition. In an aspect, the mixed metal composition can further comprise lithium. In an aspect, lithium can preferably be present in the mixed metal composition in an amount of 100 to 1000 ppm, based on the total weight of the mixed metal composition.

In an aspect, the mixed metal composition can comprise nickel and greater than 0 to 2 weight percent, based on the total weight of the mixed metal composition, of Co, Al, Cu, Fe, Mg, F, Si, or a combination thereof. In an aspect, the mixed metal composition can comprise nickel and manganese and greater than 0 to 2 weight percent, based on the total weight of the mixed metal composition, of Co, Al, Cu, Fe, Mg, F, Si, or a combination thereof. In an aspect, the mixed metal composition can comprise manganese and greater than 0 to 2 weight percent, based on the total weight of the mixed metal composition, of Co, Al, Cu, Fe, Mg, F, Si, or a combination thereof.

The mixed metal composition can be obtained, for example, from exhausted lithium-ion batteries, lithium-ion battery production waste, and the like, or a combination thereof. For example, the mixed metal composition can be obtained from a recycled feedstock, preferably a post-industrial recycled feedstock, a post-consumer recycled feedstock, or a combination thereof. In an aspect, the Co, Mn, Al, Cu, Fe, Mg, Na, Ca, Zn, F, Si, Li, or a combination thereof of the compound comprising Co, Mn, Al, Cu, Fe, Mg, Na, Ca, Zn, F, Si, Li, or a combination thereof arises from a recycled feedstock, e.g., an exhausted battery or battery manufacturing scrap. The exhausted lithium-ion batteries (or any of the foregoing lithium-ion battery component sources) can be crushed, granulated, shredded, or the like, and subjected to a physical separation process to separate solid battery components (e.g., casings, electrodes, tabs, headers, fuses, and the like) from volatile components, e.g., electrolyte solvents. Electrolyte salts (e.g., $LiPF_6$) can be removed by soaking in a suitable solvent (e.g., propylene carbonate), and the remaining undissolved materials (e.g., electrode materials, current collector) can be isolated, for example by filtration. Electrode particles can be separated from residual current collector materials, for example by contacting with a solvent suitable to dissolve the electrode particles or release them by dissolving a binder, facilitating removal of the solid metal conductor components. The isolated electrode particles can be contacted with a leaching solution to extract elements such as Ni, Co, Mn, Al, Li, and Fe. Exemplary leaching solutions can include, but are not limited to, sulfuric acid (e.g., 2 to 5 molar (M) sulfuric acid), optionally including hydrogen peroxide. The resulting solution can be centrifuged or filtered to remove any particulates and subjected to conditions effective to induce crystallization or precipitation of the desired mixed metal composition. For example, the filtered solution can be concentrated (e.g., in an evaporator) at 75 to 85° C., or 78 to 82° C., or 80° C. The concentrated solution can be cooled, e.g., to a temperature of less than 20° C., or 10 to 18° C., or 15° C. to crystallize the mixed metal composition.

The precipitated or recrystallized mixed metal composition can be isolated, for example using any suitable solid-liquid separation technique such as filtration, centrifugation, or a combination thereof. In an aspect, the mixed metal composition can be dewatered to a moisture content of 10% or less, for example 1 to 10%, or 5 to 10%, based on a total weight of the mixed metal composition product.

The mixed metal composition may be contacted with water to form a first solution. The first solution can have a pH effective to dissolve the mixed metal composition, which can be selected by the skilled person without undue experimentation. In an aspect, the first solution can have a pH of less than 7, for example less than 6.5. For example, when the mixed metal composition comprises a mixed metal hydroxide, an acidic pH can be preferred to ensure dissolution of the mixed metal hydroxide.

The method further comprises adding a salt of nickel, manganese, or a combination thereof to the first solution to provide a second solution. In an aspect, the foregoing salts can be virgin materials (i.e., not recovered or recycled from exhausted lithium-ion batteries, or otherwise previously used). In an aspect, the salt of nickel, manganese, or a combination thereof is a sulfate or a hydroxide thereof (e.g., nickel sulfate, manganese sulfate, nickel hydroxide, manganese hydroxide, or a combination thereof). In an aspect, the salt comprises $NiSO_4$ and $MnSO_4$. Use of a hydrate of $NiSO_4$ and $MnSO_4$ is mentioned.

The salt can be added in an amount effective to achieve a desired stoichiometry of the nickel and manganese. For example, the salt of nickel, manganese, or the combination thereof can be added to the first solution in an amount effective to provide a molar ratio of Ni:Mn of greater than 0 to 0.5:greater than 0 to 2, for example 0.5:1.5.

The mixed metal composition of the first solution (e.g., recovered or recycled from exhausted lithium-ion batteries or manufacturing scrap) can be contacted with the virgin salts in a suitable amount to provide the stoichiometrically-adjusted mixed metal composition. In an aspect, the mixed metal composition (i.e., of the first solution) can account for 10 to 95 weight percent of the stoichiometrically-adjusted mixed metal composition of the second solution. Within this range, the mixed metal composition can account for 15 to 95 weight percent, or 20 to 95 weight percent, or 25 to 95 weight percent, or 30 to 90 weight percent of the stoichiometrically-adjusted mixed metal composition, based on a total weight of the second solution.

The second solution can have a pH that is the same or different from the pH of the first solution. In an aspect, the pH of the second solution can be less than 7, or less than 6.5. As described above, the salt is added to achieve a desired stoichiometry of the nickel, manganese, or combination thereof of the mixed metal composition of the second solution.

In addition to the stoichiometrically-adjusted mixed metal composition, the second solution can further comprise 0.0001 to 2 weight percent, based on the total weight of the stoichiometrically-adjusted mixed metal composition, of Co, Mn, Al, Cu, Fe, Mg, Na, Ca, Zn, F, Si, Li, or a combination thereof or 0.0001 to 2 weight percent, based on the total weight of the stoichiometrically-adjusted mixed metal composition, of Co, Al, Cu, Fe, Mg, Na, Ca, Zn, F, Si, Li, or a combination thereof. Stated another way, the foregoing additional components of the mixed metal composition (e.g., Co, Mn, Al, Cu, Fe, Mg, Na, Ca, Zn, F, Si, Li, or a combination thereof) have not been removed, and thus remain present in the second solution. In an aspect, these components are not added to the either the first solution or the second solution. Rather, in an aspect, these components are present at the outset of the method, arising from the mixed metal feedstock, e.g., from the recycled batteries or battery scrap, used in the method of the present disclosure.

The method further comprises adding a cosolvent to the second solution to provide a third solution. The cosolvent is miscible with water and does not cause precipitation of the mixed metal composition. Exemplary cosolvents can include, for example, $C_{1-8}$ alcohol, a $C_{1-8}$ alkylene diol, a $C_{1-8}$ alkylene triol, or a combination thereof. In an aspect, the cosolvent can comprise ethanol, isopropanol, ethylene glycol, diethylene glycol, or a combination thereof.

The cosolvent can be added to the second solution such that the third solution comprises the cosolvent in an amount of 1 to 50 weight percent, preferably 5 to 15 weight percent, based on the total weight of the third solution.

The third solution can have a pH that is the same or different from the pH of the first solution. In an aspect, the pH of the third solution can be less than 7, or less than 6.5. Use of a third solution having a pH of 4 to 6.5, or 4.5 to 6, is mentioned.

In addition to the stoichiometrically-adjusted mixed metal composition, water, and the cosolvent, the third solution can further comprise 0.0001 to 2 weight percent, based on the total weight of the stoichiometrically-adjusted mixed metal composition, of Co, Mn, Al, Cu, Fe, Mg, Na, Ca, Zn, F, Si, Li, or a combination thereof, or 0.0001 to 2 weight percent, based on the total weight of the stoichiometrically-adjusted mixed metal composition, of Co, Al, Cu, Fe, Mg, Na, Ca, Zn, F, Si, Li, or a combination thereof. Stated another way, the foregoing components of the mixed metal composition (e.g., Co, Mn, Al, Cu, Fe, Mg, Na, Ca, Zn, F, Si, Li, or a combination thereof) have not been removed, and thus remain present in the third solution. It is noted that these components are not added to any of the first solution, the second solution, or the third solution. Rather they are present at the outset of the method, arising from the mixed metal feedstock, e.g., from the recycled batteries or battery scrap, used in the method of the present disclosure.

The method further comprises combining the third solution with a basic solution to form a precipitate. In an aspect, the basic solution can be added to the third solution. In an aspect, the third solution is preferably added to the basic solution to form the precipitate.

The basic solution is preferably an aqueous basic solution and therefore can comprise a suitable base in water. The base can comprise, for example, an alkali metal hydroxide, ammonia, an alkali metal carbonate, an alkali metal bicarbonate, or a combination thereof. Combination of the basic solution and the third solution can be with agitation, for example at a speed of 500-1500 RPM at a temperature of 25 to 90° C.

In an aspect, the basic solution can comprise the alkali metal carbonate, the alkali metal bicarbonate, or a combination thereof. In an aspect, when used in combination, the alkali metal carbonate and the alkali metal bicarbonate can be present in a molar ratio of 1.04:1 to 1:1.04, preferably 1.01:1 to 1:1.01. In a specific aspect, the molar ratio of alkali metal carbonate to alkali metal bicarbonate can be 1:1. When the basic solution comprises the alkali metal carbonate, the alkali metal bicarbonate, or a combination thereof, the basic solution can be combined with the third solution in an amount effective to provide a pH of greater than 7, preferably 7 to 10, or 7 to 9, or 7 to 8.

In an aspect, the basic solution can comprise the alkali metal hydroxide and optionally ammonia. In an aspect, the basic solution can comprise the alkali metal hydroxide and ammonia and a molar ratio of alkali metal hydroxide to ammonia can be, for example, 2:1 to 1:2, 3:2 to 2:3, 1.04:1 to 1:1.04, preferably 1.01:1 to 1:1.01. In a specific aspect, the molar ratio of alkali metal hydroxide to ammonia can be 1:1. When the basic solution comprises the alkali metal hydroxide and ammonia, the basic solution can be combined with the third solution in an amount effective to provide a pH of greater than or equal to 10, preferably 10-13, more preferably 11-12. In an aspect, particularly when the basic solution comprises the alkali metal hydroxide and optionally ammonia, no precipitate is generated or separated from the third solution at a pH of less than 10.

Combination of the basic solution and the third solution can coprecipitate a purified mixed metal composition having the desired ratio of, for example, Ni and Mn, referred to herein as a "precipitate" for simplicity. For example, the precipitate can comprise $Ni(OH)_2$ and $Mn(OH)_2$, preferably in a molar ratio of greater than 0 to 0.5:greater than 0 to 2, preferably 0.5:1.5. In an aspect, the precipitate can comprise $NiCO_3$ and $MnCO_3$, preferably in a molar ratio of greater than 0 to 0.5:greater than 0 to 2, preferably 0.5:1.5. The precipitate can further include 5 to 100 ppm Li, for example 10 to 25 ppm Li, based on the total weight of the precipitate.

Optionally, a chelating agent can be added to the third solution. When a chelating agent is added, it can be added to the third solution before, during or after addition of the basic solution. Exemplary chelating agents can include, but are not limited to, 5-sulfosalicylic acid. When present, the chelating agent can be added in an amount effective to provide a concentration of 0.1 to 10 M in the third solution.

The method can further include isolating the precipitate. Isolation can be using any suitable liquid-solid separation technique, including, for example, filtration, centrifugation, or a combination thereof. The precipitate can be washed (e.g., with deionized water, distilled water, or a combination thereof) and dried (e.g., at a temperature of 80 to 100° C., for example 85 to 95° C., under nitrogen).

The method further comprises adding a lithium compound to the precipitate to form a lithiated precursor mixture (also referred to herein as "the mixture" for simplicity) and heat-treating the precursor mixture under conditions effective to provide the cathode active material comprising at least one phase having a spinel structure. Exemplary lithium compounds can include lithium hydroxide, lithium carbonate, lithium oxide, lithium oxalate, or a combination thereof. In an aspect, the lithium compound can comprise lithium hydroxide.

Heat-treating the mixture can comprise calcining at a temperature of 550 to 950° C. for 4 to 48 hours in the presence of air. In an aspect, heat-treating the mixture can comprise calcining at a first temperature of 800 to 1000° C. for a first period of time, and calcining at a second temperature of 600 to less than 800° C. for a second period of time subsequent to the first period of time in the presence of air.

Accordingly, the cathode active material can comprise Li and a metal comprising Ni and Mn. The Li and metal (i.e., Ni and Mn) can be present in a Li:metal ratio of 1:1.67 to 1:2.1, preferably 1:2. For example, the cathode active material can comprise a compound according to the Formula $$Li_{1+x}M_{2+y}O_{4-z}A_z$$

wherein M is Ni and Mn, A is an oxygen vacancy, F, Cl or a combination thereof, $0 \le x \le 0.2$, $0 \le y \le 0.1$, and $0 \le z \le 0.1$, and wherein the compound according to the Formula $Li_{1+x}M_{2+y}O_{4-z}A_z$ has a spinel structure. In an aspect, the resulting cathode active material can comprise $Li_{1+x}Ni_{0.5}Mn_{1.5}O_4$, wherein $0 \le x \le 0.2$, preferably $LiNi_{0.5}Mn_{1.5}O_4$. Other cathode active materials can be obtained according to the method described herein using alternate battery chemistries, alternate composition stoichiometries, or both.

The cathode active material prepared by the method disclosed herein comprises at least one phase having a spinel structure. "Spinel structure" as would be understood by an artisan in the solid-state sciences and as is used herein means that the compound is isostructural with spinel, i.e., $MgAl_2O_4$. The spinel structure can refer to phase having a cubic crystal structure including $MO_6$ octahedra (wherein M is Ni and Mn) and a space group of Fd-3m or $P4_332$. The spinel structure of the cathode active material can be characterized using, for example, X-ray diffraction (XRD).

A cathode active material prepared according to the method described herein represents another aspect of the present disclosure.

In an aspect, a cathode active material can comprise a first phase having a formula of $Li_{1+x}M_{2+y}O_{4-z}A_z$ and having a spinel structure, and a second phase, wherein M is Ni and Mn; A is an oxygen vacancy, F, Cl, or a combination thereof; $0 \le x \le 0.2$; $0 \le y \le 0.1$; $0 \le z \le 0.1$; and the second phase is derived from a recycled feedstock. For example, the second phase can comprise a compound comprising one or more of Co, Al, Cu, Fe, Mg, Na, Ca, Zn, F, Si, Li, or a combination thereof. In an aspect, the second phase derived from the recycled feedstock is present in an amount of 0.01 to 10 weight percent (wt %), 0.1 to 5 wt %, or 0.2 to 2 wt %, based on the total weight of the cathode active material. In an aspect, the Co, Al, Cu, Fe, Mg, Na, Ca, Zn, F, Si, Li, or a combination thereof can be derived from a recycled feedstock.

In an aspect, a cathode active material can comprise a first phase of the formula $Li_{1+x}M_{2+y}O_{4-z}A_z$ having a spinel structure, wherein M is Ni, and Mn; A is an oxygen vacancy, F, Cl, or a combination thereof; $0 \le x \le 0.2$; $0 \le y \le 0.1$; $0 \le z \le 0.1$; and wherein the first phase further comprises Co, Al, Cu, Fe, Mg, Na, Ca, Zn, F, Si, Li, or a combination thereof.

The cathode active material can optionally further comprise a layered phase. A layered phase is a compound having a layered structure, such as a compound which is isostructural $LiCoO_2$. For example, the layered phase can comprise a layered $Li_uMO_2$ phase, wherein $0<u<1.5$ and wherein M is Ni, Co, Mn, Al, or a combination thereof. In an aspect, the layered phase can comprise a layered $LiNi_xCo_yMn_{1-x-y}O_2$, wherein $0 \le x \le 1$, $0 \le y \le 1$, and $x+y=1$. The layered phase can be derived from a recycled feedstock or can be a virgin layered phase (i.e., one which has not been prepared using a recycled feedstock). In an aspect, the layered phase is derived from a recycled feedstock. The layered phase can comprise one or more of the following: Cu, Fe, Mg, Na, Ca, Zn, F, Si, Li, or a combination thereof. In an aspect, the Cu, Fe, Mg, Na, Ca, Zn, F, Si, Li, or a combination thereof can be derived from a recycled feedstock.

When present, the first phase and the layered phase can be present in the cathode active material in a weight ratio of 1:99 to 99:1, or 10:90 to 90:10, or 20:80 to 80:20, or 30:70 to 70:30, or 40:60 to 60:40, or 45:55 to 55:45.

In an aspect, the cathode active material can be used in combination with a virgin cathode active material (i.e., one which has not been prepared using a recycled feedstock). For example, a cathode active material can comprise a first cathode active material comprising the first phase of the formula $Li_{1+x}M_{2+y}O_{4-z}A_z$ having a spinel structure; and the second phase derived from recycled feedstock; and a second cathode active material comprising a cathode active material derived from virgin feedstock. In an aspect, a cathode active material can comprise a first cathode active material comprising the first phase and further comprising Cu, Fe, Mg, Na, Ca, Zn, F, Si, Li, or a combination thereof; and a second cathode active material comprising a cathode active material derived from virgin feedstock. The cathode active material of the present disclosure and a virgin cathode active material can be combined in a weight ratio of 1:99 to 99:1, or 10:90 to 90:10, or 20:80 to 80:20, or 30:70 to 70:30, or 40:60 to 60:40, or 45:55 to 55:45, or 50:50.

The cathode active material disclosed herein can exhibit one or more advantageous properties. For example, the cathode active material can have a discharge capacity of greater than 100 mAh/g (e.g., 135 mAh/g) at a discharge rate of C/20 for a half-cell over 100 cycles at 20° C. when using a lithium anode and an electrolyte comprising 1 M $LiPF_6$ in a 1:1 by volume ethylene carbonate:dimethyl carbonate. In an aspect, the cathode active material can have a discharge capacity of 110 mAh/g at a rate of 5 C or a discharge capacity of 90 mAh/g at a rate of 10 C over 100 cycles. The C rate refers to a current which will discharge the cell in one hour, thus 10 C refers to a current which will discharge the cell in 6 minutes.

The cathode active material described herein can be particularly useful in a battery cathode. A battery cathode can therefore comprise a cathode active material made by the method described herein, optionally in combination with a virgin cathode active material (i.e., one which has not been prepared using a recycled feedstock).

This disclosure is further illustrated by the following examples, which are non-limiting.

EXAMPLES

Comparative Example 1

Metal sulfate solution ($MSO_4$) in water having a concentration of 2 moles per liter (M) with a stoichiometric ratio of Ni:Mn of 1:3 is prepared using battery grade starting materials. Ethanol is added to the metal sulfate solution at a concentration of 10 weight percent, based on the total weight of the solution.

$NH_4HCO_3$ or $(NH_4)_2CO_3$ is used as the precipitant. A 3 liter (L) continuous stir tank reactor (CSTR) is charged with 0.15 M $NH_4HCO_3$ or $(NH_4)_2CO_3$ solution followed by coaddition of the metal sulfate solution ($MSO_4$) to form a precipitate. The precipitate slurry is stirred at a temperature of 25 to 80° C. for 3 to 24 hours.

The precipitates are filtered and washed with water. To ensure removal of any remaining sulfate ion or metal impurity ion on the precipitate surface, the conductivity of the filtrate solution is monitored until it is well below 400 S/cm. The filtered wet cake is then dried at 90° C. under $N_2$ flow to provide the precursor cathode active material (pCAM).

Cathode active material (CAM) is prepared from the pCAM of Comparative Example 1 by mixing pulverized pCAM and a lithium source (e.g., LiGH, $Li_2CO_3$, $Li_2C_2O_4$) at a Li:M molar ratio of 0.5<Li:M<0.6. The mixture is calcined in air at a temperature of 850° C. for 24 hours, followed by calcination at 600° C. for 10 hours. After cooling, the CAM is pulverized and screened using a 350 mesh sieve. Analysis by ICP-OES will show a Ni:Mn of 1:3. Analysis by X-ray Diffraction (XRD) will show a spinel crystal structure is obtained.

Example 1

Metal sulfate solution ($MSO_4$) in water having a concentration of 2 moles per liter (M) with a stoichiometric ratio of Ni:Mn of 1:3 is prepared using 30 wt % of recycled mixed metal sulfate and 70 wt % battery grade starting materials (i.e., $NiSO_4$ and $MnSO_4$). The recycled mixed metal sulfate (MMS) comprises 20 wt % Ni and 0.86 wt % Co with trace amounts of impurities (e.g., Al, Cu). Ethanol is added to the metal sulfate solution at a concentration of 10 weight percent, based on the total weight of the solution.

$NH_4HCO_3$ or $(NH_4)CO_3$ is used as the precipitant. A 3 liter (L) continuous stir tank reactor (CSTR) is charged with 0.15 molar (M) $NH_4HCO_3$ or $(NH_4)CO_3$ solution followed by coaddition of the metal sulfate solution ($MSO_4$) to form a precipitate. The precipitate slurry is stirred at a temperature of 25 to 80° C. for 3 to 24 hours.

The precipitates are filtered and washed with water. To ensure removal of any remaining sulfate ion or metal impurity ion on the precipitate surface, the conductivity of the filtrate solution is monitored until it was well below 400 S/cm. The filtered wet cake is then dried at 90° C. under $N_2$ flow to provide the precursor cathode active material (pCAM).

Cathode active material (CAM) is prepared from the pCAM of Example 1 by mixing pulverized pCAM and a lithium source (e.g., LiGH, $Li_2CO_3$, $Li_2C_2O_4$) at a Li:M molar ratio of 0.5<Li:M<0.6. The mixture is calcined in air at a temperature of 850° C. for 24 hours, followed by calcination at 600° C. for 10 hours. After cooling, the CAM is pulverized and screened using a 350 mesh sieve. Analysis by ICP-OES will show a Ni:Mn of 1:3. Analysis by X-ray Diffraction (XRD) will show a spinel crystal structure is obtained.

Example 2

Cathode active material is prepared using the same materials and procedure as in Example 1, except that diethylene glycol was used as the cosolvent in place of ethanol during the precipitation.

This disclosure further encompasses the following aspects.

Aspect 1: A method of making a cathode active material, the method comprising: contacting a mixed metal composition with water to form a first solution, the mixed metal composition comprising nickel, and greater than 0 to 2 weight percent, based on the total weight of the mixed metal composition, of a compound comprising Co, Mn, Al, Cu, Fe, Mg, Na, Ca, Zn, F, Si, Li, or a combination thereof; adding a salt of nickel, manganese, or a combination thereof to the first solution to provide a second solution; adding a cosolvent to the second solution to provide a third solution;

combining the third solution and a basic solution to form a precipitate; adding a lithium compound to the precipitate to form a mixture; and heat-treating the mixture under conditions effective to provide the cathode active material, wherein the cathode active material comprises at least one phase having a spinel structure.

Aspect 2: A method of making a cathode active material, the method comprising: contacting a mixed metal composition with water to form a first solution, the mixed metal composition comprising nickel and manganese, and greater than 0 to 2 weight percent, based on the total weight of the mixed metal composition, of a compound comprising Co, Al, Cu, Fe, Mg, Na, Ca, Zn, F, Si, Li, or a combination thereof; adding a salt of nickel, manganese, or a combination thereof to the first solution to provide a second solution; adding a cosolvent to the second solution to provide a third solution; combining the third solution and a basic solution to form a precipitate; adding a lithium compound to the precipitate to form a mixture; and heat-treating the mixture under conditions effective to provide the cathode active material; wherein the cathode active material comprises at least one phase having a spinel structure.

Aspect 3: A method of making a cathode active material, the method comprising: contacting a mixed metal composition with water to form a first solution, the mixed metal composition comprising manganese, and greater than 0 to 2 weight percent, based on the total weight of the mixed metal composition, of a compound comprising Co, Al, Cu, Fe, Mg, Na, Ca, Zn, F, Si, Li, or a combination thereof; adding a salt of nickel, manganese, or a combination thereof to the first solution to provide a second solution; adding a cosolvent to the second solution to provide a third solution; combining the third solution and a basic solution to form a precipitate; adding a lithium compound to the precipitate to form a mixture; and heat-treating the mixture under conditions effective to provide the cathode active material, wherein the cathode active material comprises at least one phase having a spinel structure.

Aspect 4: The method of any of aspects 1 to 3, wherein the cosolvent comprises a $C_{1-8}$ alcohol, a $C_{1-8}$ alkylene diol, a $C_{1-8}$ alkylene triol, or a combination thereof, preferably wherein the cosolvent comprises ethanol, isopropanol, ethylene glycol, diethylene glycol, or a combination thereof.

Aspect 5: The method of any of aspects 1 to 4, wherein the cosolvent is present in the third solution in an amount of 1 to 50 weight percent, preferably 5 to 15 weight percent, based on the total weight of the third solution.

Aspect 6: The method of any of aspects 1 or 4 to 5, wherein the mixed metal composition is obtained by a method comprising contacting electrode particles comprising nickel, and greater than 0 to 2 weight percent, based on the total weight of the mixed metal composition, of a compound comprising Co, Mn, Al, Cu, Fe, Mg, Na, Ca, Zn, F, Li, or a combination thereof; with a leaching solution, preferably comprising sulfuric acid; precipitating the mixed metal composition from the leaching solution; and isolating the mixed metal composition from the leaching solution.

Aspect 7: The method of any of aspects 2 or 4 to 5, wherein the mixed metal composition is obtained by a method comprising contacting electrode particles comprising nickel and manganese, and greater than 0 to 2 weight percent, based on the total weight of the mixed metal composition, of a compound comprising Co, Al, Cu, Fe, Mg, Na, Ca, Zn, F, Li, or a combination thereof; with a leaching solution, preferably comprising sulfuric acid; precipitating the mixed metal composition from the leaching solution; and isolating the mixed metal composition from the leaching solution.

Aspect 8: The method of any of aspects 3 to 5, wherein the mixed metal composition is obtained by a method comprising contacting electrode particles comprising manganese, and greater than 0 to 2 weight percent, based on the total weight of the mixed metal composition, of a compound comprising Co, Al, Cu, Fe, Mg, Na, Ca, Zn, F, Li, or a combination thereof; with a leaching solution, preferably comprising sulfuric acid; precipitating the mixed metal composition from the leaching solution; and isolating the mixed metal composition from the leaching solution.

Aspect 9: The method of any of aspects 1 to 8, wherein the mixed metal composition comprises a mixed metal sulfate, a mixed metal nitrate, a mixed metal carbonate, a mixed metal halide, a mixed metal hydroxide, a mixed metal oxalate, or a combination thereof.

Aspect 10: The method of any of aspects 1 to 9, wherein the mixed metal composition comprises a mixed metal sulfate.

Aspect 11: The method of any of aspects 1 to 10, wherein the mixed metal composition further comprises lithium, preferably in an amount of 100 to 1000 ppm, based on the total weight of the mixed metal composition.

Aspect 12: The method of any of aspects 1 to 11, wherein the mixed metal composition is obtained from a recycled feedstock, preferably a post-industrial recycled feedstock, a post-consumer recycled feedstock, or a combination thereof.

Aspect 13: The method of any of aspects 1 to 12, wherein the mixed metal composition comprises 0.5 to 1.5 weight percent Co, 50 to 300 ppm Cu, 50 to 200 ppm of Al, 5 to 100 ppm of Fe, and 5 to 100 ppm of F, each based on the total weight of the mixed metal composition.

Aspect 14: The method of any of aspects 1 to 13, wherein the first solution has a pH of less than 7, or less than 6.5.

Aspect 15: The method of any of aspects 1 to 14, wherein the salt of nickel, manganese, or a combination thereof is a sulfate or a hydroxide thereof.

Aspect 16: The method of any of aspects 1 to 15, wherein method comprises adding a salt of nickel or manganese to the first solution in an amount effective to provide a molar ratio of Ni:Mn of greater than 0 to 0.5:greater than 0 to 2, preferably 0.5:1.5.

Aspect 17: The method of aspect 16, wherein the salt comprises $NiSO_4$, and $MnSO_4$.

Aspect 18: The method of any of aspects 1 to 17, wherein the second solution has a pH of less than 7, or less than 6.5.

Aspect 19: The method of any of aspects 1 or 4 to 18, wherein the second solution comprises of 0.0001 to 2 weight percent, based on the total weight of the solution, of Co, Mn, Al, Cu, Fe, Mg, Na, Ca, Zn, F, Li, or a combination thereof.

Aspect 20: The method of any of aspects 2 or 4 to 18, wherein the second solution comprises of 0.0001 to 2 weight percent, based on the total weight of the solution, of Co, Al, Cu, Fe, Mg, Na, Ca, Zn, F, Li, or a combination thereof.

Aspect 21: The method of any of aspects 3 to 18, wherein the second solution comprises of 0.0001 to 2 weight percent, based on the total weight of the solution, of Co, Al, Cu, Fe, Mg, Na, Ca, Zn, F, Li, or a combination thereof.

Aspect 22: The method of any of aspects 1 to 21, wherein the basic solution comprises a base comprising an alkali metal hydroxide, ammonia, an alkali metal carbonate, an alkali metal bicarbonate, or a combination thereof.

Aspect 23: The method of aspect 22, wherein the basic solution comprises a base comprising the alkali metal carbonate, the alkali metal bicarbonate, or a combination thereof, preferably wherein the alkali metal carbonate and the alkali metal bicarbonate is present in a ratio of 1.04:1 to 1:1.04, preferably 1.01:1 to 1:1.01, more preferably 1:1.

Aspect 24: The method of aspect 23, wherein the basic solution is combined with the third solution in an amount effective to provide a pH of greater than 7, preferably 7 to 10, or 7 to 9, or 7 to 8.

Aspect 25: The method of aspect 22, wherein the basic solution comprises the alkali metal hydroxide, preferably sodium hydroxide and ammonia, more preferably wherein the sodium hydroxide and ammonia are present in a ratio of 1.04:1 to 1:1.04, preferably 1.01:1 to 1:1.01, more preferably 1:1.

Aspect 26: The method of aspect 25, wherein the basic solution is combined with the third solution in an amount effective to provide a pH of greater than or equal to 10, preferably 10-13, more preferably 11-12.

Aspect 27: The method of any of aspects 1 to 26, further comprising adding a chelating agent to the third solution, preferably wherein the chelating agent is present in the third solution in an amount of 0.1 to 10 M.

Aspect 28: The method of aspects 23 or 24, wherein the precipitate comprises $NiCO_3$ and $MnCO_3$, preferably in a molar ratio of greater than 0 to 0.5:greater than 0 to 2, preferably 0.5:1.5.

Aspect 29: The method of aspects 25 or 26, wherein the precipitate comprises $Ni(OH)_2$ and $Mn(OH)_2$, preferably in a molar ratio of greater than 0 to 0.5:greater than 0 to 2, preferably 0.5:1.5.

Aspect 30: The method of any of aspects 1 to 29, wherein the precipitate comprises 5 to 100 ppm Li, preferably 10 to 25 ppm Li, based on the total weight of the precipitate.

Aspect 31: The method of any of aspects 1 to 30, wherein the lithium compound comprises lithium hydroxide, lithium carbonate, lithium oxide, lithium oxalate, or a combination thereof.

Aspect 32: The method of any of aspects 1 to 31, wherein the cathode active material comprises Li in a Li:metal ratio of 1:1.9 to 1:2.1, or 1:2 to 1:2.1.

Aspect 33: The method of any of aspects 1 to 32, wherein the heat-treating comprises calcining at a temperature of 550 to 950° C. for 4 to 48 hours in the presence of air.

Aspect 34: The method of any of aspects 1 to 33, wherein the heat-treating comprises calcining at a first temperature of 800 to 1000° C. for a first time, and calcining at a second temperature of 600 to less than 800° C. for a second time subsequent to the first time in the presence of air.

Aspect 35: The method of any of aspects 1 to 34, further comprising agitating the third solution at a speed of 500 to 1500 RPM at a temperature of 25 to 90° C.

Aspect 36: The method of any of aspects 1 to 35, further comprising isolating the precipitate.

Aspect 37: A cathode active material made by the method of any of aspects 1 to 36.

Aspect 38: A cathode active material comprising: a first phase having a formula of $Li_{1+x}M_{2+y}O_{4-z}A_z$ and having a spinel structure; and a second phase; wherein M is Ni and Mn; A is an oxygen vacancy, F, Cl, or a combination thereof; $0 \le x \le 0.2$; $0 \le y \le 0.1$; $0 \le z \le 0.1$; and the second phase is derived from a recycled feedstock.

Aspect 39: The cathode active material of aspect 38, wherein the second phase comprises one or more of Co, Al, Cu, Fe, Mg, Na, Ca, Zn, F, Si, or Li.

Aspect 40: The cathode active material of aspect 38 or 39, wherein the second phase is derived from a recycled feedstock present in an amount of 1 to 99 weight percent, based on the total weight of the cathode active material.

Aspect 41: A cathode active material comprising: a first phase having a formula of $Li_{1+x}M_{2+y}O_{4-z}A_z$ and having a spinel structure, wherein M is Ni, and Mn, A is an oxygen vacancy, F, Cl, or a combination thereof, $0 \le x \le 0.2$, $0 \le y \le 0.1$, $0 \le z \le 0.1$, and wherein the first phase further comprises Co, Al, Cu, Fe, Mg, Na, Ca, Zn, F, Si, Li, or a combination thereof.

Aspect 42: The cathode active material of aspect 41, wherein the Co, Al, Cu, Fe, Mg, Na, Ca, Zn, F, Si, Li, or a combination thereof is derived from a recycled feedstock.

Aspect 43: The cathode active material of any of aspects 38 to 42, wherein the first phase comprises $LiNi_{0.5}Mn_{1.5}O_4$.

Aspect 44: The cathode active material of any of aspects 38 to 43, further comprising a layered phase, which is preferably isostructural with $LiCoO_2$.

Aspect 45: The cathode active material of aspect 44, wherein the layered phase comprises a layered phase having a formula of $Li_uMO_2$, wherein $0<u<1.5$ and wherein M is Ni, Co, Mn, Al, or a combination thereof.

Aspect 46: The cathode active material of aspect 44 or 45, wherein the layered phase comprises a layered $LiNi_xCo_yMn_{1-x-y}O_2$, wherein $0 \le x \le 1$, $0 \le y \le 1$, and $x+y=1$.

Aspect 47: The cathode active material of any of aspects 44 to 46, wherein the layered phase is derived from a recycled feedstock.

Aspect 48: The cathode active material of aspect 47, wherein the layered phase comprises one or more of Cu, Fe, Mg, Na, Ca, Zn, F, Si, Li, or a combination thereof.

Aspect 49: The cathode active material of aspects 47 or 48, wherein the layered phase further comprises Cu, Fe, Mg, Na, Ca, Zn, F, Si, Li, or a combination thereof.

Aspect 50: The cathode active material of aspect 49, wherein the Cu, Fe, Mg, Na, Ca, Zn, F, Si, Li, or a combination thereof is derived from a recycled feedstock.

Aspect 51: The cathode active material of any of aspects 44 to 50, wherein the first phase and the layered phase are present in a weight ratio of 1:99 to 99:1, or 10:90 to 90:10, or 20:80 to 80:20, or 30:70 to 70:30, or 40:60 to 60:40, or 45:55 to 55:45.

Aspect 52: The cathode active material of aspect 38, comprising a first cathode active material comprising the first phase; and the second phase derived from a recycled feedstock; and a second cathode active material comprising a cathode active material derived from a virgin feedstock.

Aspect 53: The cathode active material of aspect 41, comprising a first cathode active material comprising the first phase and further comprising Cu, Fe, Mg, Na, Ca, Zn, F, Si, Li, or a combination thereof; and a second cathode active material comprising a cathode active material derived from the virgin feedstock.

Aspect 54: The cathode active material of aspects 52 or 53, wherein the first cathode active material and the second cathode active material are combined in a weight ratio of 1:99 to 99:1.

The compositions and methods can alternatively comprise, consist of, or consist essentially of, any appropriate materials, steps, or components herein disclosed. The compositions and methods can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "an aspect" means that a particular element described in connection with the aspect is included in at least one aspect described herein and may or may not be present in other aspects. The term "combination thereof" as used herein includes one or more of the listed elements, and is open, allowing the presence of one or more like elements not named. In addition, it is to be understood that the described elements may be combined in any suitable manner in the various aspects.

It will be further understood that the terms "comprises" and/or "comprising," or "includes" or "including" when used in this specification, specify the presence of stated features, regions, integers, steps, operations, elements, or components, but do not preclude the presence or addition of one or more other features, regions, integers, steps, operations, elements, components, or groups thereof.

Various aspects are shown in the accompanying drawings. This invention may, however, be embodied in many different forms, and should not be construed as limited to the aspects set forth herein. Rather, these aspects are provided so that this disclosure will be thorough and complete, and will fully convey the scope of the invention to those skilled in the art. Like reference numerals refer to like elements throughout.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

U.S. Provisional Patent Application No. 63/338,485, filed on May 5, 2022 is hereby incorporated by reference in its entirety for all purposes.

While a particular aspect has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of making a cathode active material, the method comprising:
   - contacting a mixed metal composition with water to form a first solution, the mixed metal composition comprising
     - nickel, and
     - greater than 0 weight percent and less than or equal to 2 weight percent, based on the total weight of the mixed metal composition, of a compound comprising Co, Mn, Al, Cu, Fe, Mg, Na, Ca, Zn, F, Si, Li, or a combination thereof;
   - adding a salt of nickel, a salt of manganese, or a combination thereof to the first solution to provide a second solution;
   - adding a cosolvent to the second solution to provide a third solution;
   - combining the third solution and a basic solution to form a precipitate;
   - adding a lithium compound to the precipitate to form a mixture; and
   - heat-treating the mixture under conditions effective to provide the cathode active material,
   - wherein the cathode active material comprises at least one phase having a spinel structure,
   - wherein the cathode active material comprises Li in a Li:metal ratio of 1:1.9 to 1:2.1.

2. The method of claim 1, wherein the cosolvent comprises a $C_{1-8}$ alcohol, a $C_{1-8}$ alkylene diol, a $C_{1-8}$ alkylene triol, or a combination thereof;
   - optionally wherein the cosolvent is present in the third solution in an amount of 1 to 50 weight percent, based on the total weight of the third solution.

3. The method of claim 1, wherein the mixed metal composition is obtained by a method comprising
   - contacting electrode particles with a leaching solution, wherein the electrode particles comprise
     - nickel, and
     - greater than 0 weight percent and less than or equal to 2 weight percent, based on the total weight of the mixed metal composition, of a compound comprising Co, Mn, Al, Cu, Fe, Mg, Na, Ca, Zn, F, Li, or a combination thereof;
   - precipitating the mixed metal composition from the leaching solution; and
   - isolating the mixed metal composition from the leaching solution.

4. The method of claim 1, wherein the mixed metal composition comprises a mixed metal sulfate, a mixed metal nitrate, a mixed metal carbonate, a mixed metal halide, a mixed metal hydroxide, a mixed metal oxalate, or a combination thereof.

5. The method of claim 1, wherein the mixed metal composition further comprises lithium.

6. The method of claim 1, wherein at least a portion of the mixed metal composition is obtained from a recycled feedstock.

7. The method of claim 1, wherein the first solution has a pH of less than 7 or wherein the second solution has a pH of less than 7.

8. The method of claim 1, wherein the salt of nickel, the salt of manganese, or a combination thereof is a sulfate or a hydroxide thereof.

9. The method of claim 1, wherein method comprises adding the salt of nickel or the salt of manganese to the first solution in an amount effective to provide a molar ratio of Ni:Mn of greater than 0 and up to 0.5:greater than 0 and up to 2.

10. The method of claim 1, wherein the basic solution is combined with the third solution in an amount effective to provide a pH of greater than 7.

11. The method of claim 1, wherein the basic solution is combined with the third solution in an amount effective to provide a pH of greater than or equal to 10.

12. The method of claim 1, wherein the precipitate comprises $NiCO_3$ and $MnCO_3$.

13. The method of claim 1, wherein the precipitate comprises $Ni(OH)_2$ and $Mn(OH)_2$.

14. The method of claim 1, wherein the precipitate comprises 5 to 100 ppm Li, based on the total weight of the precipitate.

15. The method of claim 1, wherein the lithium compound comprises lithium hydroxide, lithium carbonate, lithium oxide, lithium oxalate, or a combination thereof.

16. A method of making a cathode active material, the method comprising:

contacting a mixed metal composition with water to form a first solution, the mixed metal composition comprising manganese, and greater than 0 weight percent and less than or equal to 2 weight percent, based on the total weight of the mixed metal composition, of a compound comprising Co, Al, Cu, Fe, Mg, Na, Ca, Zn, F, Si, Li, or a combination thereof;

adding a salt of nickel, a salt of manganese, or a combination thereof to the first solution to provide a second solution;

adding a cosolvent to the second solution to provide a third solution;

combining the third solution and a basic solution to form a precipitate;

adding a lithium compound to the precipitate to form a mixture; and heat-treating the mixture under conditions effective to provide the cathode active material, wherein the cathode active material comprises at least one phase having a spinel structure, wherein the cathode active material comprises Li in a Li:metal ratio of 1:1.9 to 1:2.1.

17. The method of claim 16, wherein the mixed metal composition is obtained by a method comprising contacting electrode particles with a leaching solution, wherein the electrode particles comprise manganese, and greater than 0 weight percent and less than or equal to 2 weight percent, based on the total weight of the mixed metal composition, of a compound comprising Co, Al, Cu, Fe, Mg, Na, Ca, Zn, F, Li, or a combination thereof;

precipitating the mixed metal composition from the leaching solution; and isolating the mixed metal composition from the leaching solution.

18. A method of making a cathode active material, the method comprising:

contacting a mixed metal composition with water to form a first solution, the mixed metal composition comprising nickel and manganese, and greater than 0 weight percent and less than or equal to 2 weight percent, based on the total weight of the mixed metal composition, of a compound comprising Co, Al, Cu, Fe, Mg, Na, Ca, Zn, F, Si, Li, or a combination thereof;

adding a salt of nickel, a salt of manganese, or a combination thereof to the first solution to provide a second solution;

adding a cosolvent to the second solution to provide a third solution;

combining the third solution and a basic solution to form a precipitate;

adding a lithium compound to the precipitate to form a mixture; and heat-treating the mixture under conditions effective to provide the cathode active material;

wherein the cathode active material comprises at least one phase having a spinel structure, wherein the cathode active material comprises Li in a Li:metal ratio of 1:1.9 to 1:2.1.

19. The method of claim 18, wherein the mixed metal composition is obtained by a method comprising contacting electrode particles with a leaching solution, wherein the electrode particles comprise nickel and manganese, and greater than 0 weight percent and less than or equal to 2 weight percent, based on the total weight of the mixed metal composition, of a compound comprising Co, Al, Cu, Fe, Mg, Na, Ca, Zn, F, Li, or a combination thereof;

precipitating the mixed metal composition from the leaching solution; and isolating the mixed metal composition from the leaching solution.

* * * * *